THREE-LEVEL BINARY CODE TRANSMISSION

Original Filed Nov. 23, 1959 2 Sheets-Sheet 1

INVENTOR
L. C. THOMAS
BY R. B. Andis
ATTORNEY

THREE-LEVEL BINARY CODE TRANSMISSION

Original Filed Nov. 23, 1959 2 Sheets-Sheet 2

INVENTOR
L. C. THOMAS
BY R. B. Ardis
ATTORNEY

United States Patent Office 3,154,777

Patented Oct. 27, 1964

3,154,777

THREE-LEVEL BINARY CODE TRANSMISSION

Lewis C. Thomas, North Plainfield, N.J., assignor to Bell Telephone Laboratories, Incorporated, New York, N.Y., a corporation of New York Continuation of application Ser. No. 854,818, Nov. 23, 1959. This application July 25, 1962, Ser. No. 215,236
12 Claims. (Cl. 340—347)

This invention relates generally to the transmission of information by pulse techniques and more particularly, although in its broader aspects not exclusively, to transmission by pulse code techniques based upon a two-level or binary code.

This application is a continuation of the present inventor's prior application Serial No. 854,818, which was filed November 23, 1959, and has since been abandoned.

In the past, the most common transmission between encoder and decoder in a pulse code modulation or PCM system has been in the form of a unipolar or two-level pulse train. The intelligence to be transmitted is sampled periodically and each sample is converted into a binary code group of marks and spaces occupying a predetermined number of successive pulse periods or time slots. Each mark, sometimes known as an ON pulse, is normally represented by one predetermined energy level, while each space, sometimes known as an OFF pulse, is normally represented by another. The energy level for a space or OFF pulse, in fact, is commonly zero.

The usual unipolar PCM pulse train has a power density spectrum with both continuous and discrete components. The continuous component has its maximum at zero frequency and diminishes gradually until it reaches zero at a frequency equal to twice the basic pulse repetition frequency or bit rate of the system. At higher frequencies, the amplitude of the continuous component departs from zero again but remains so low as to be relatively insignificant. The discrete components of the power density spectrum of the normal unipolar pulse train appear at zero frequency and at the bit rate. Additional discrete components appear at odd multiples of the bit rate but are relatively insignificant in amplitude.

It is the discrete spectrum of the unipolar PCM pulse train that is of principal interest when self-timed repeaters are employed in the system. The discrete component at the bit rate can be recovered by filtering at repeater points and used to time the regeneration of the pulse train. Difficulty is likely to occur, however, if pulse trains transmitted over adjacent lines in a single cable have the same bit rate, since it is unlikely that they will have the same phase at all times. If there is any appreciable amount of crosstalk between lines, the discrete component at the timing frequency is likely to undergo phase distortion and timing errors at repeater points can result.

A principal object of the invention, therefore, is to reduce timing crosstalk between adjacent lines in a PCM system in as simple a manner as possible.

Another and more particular object is to reduce the frequency of the first discrete component above direct current in the power density spectrum of a binary code pulse train.

Still another object of the invention is to provide discrete components at different frequencies in the power density spectra of binary code pulse trains on different lines.

Very broadly, the present invention can be characterized by the phrase "time polarity control." In accordance with the invention, the normal two-valued binary code train of ON and OFF pulses is converted into a pseudo-ternary or three-level train by selecting successive groups of $n$ consecutive time slots from the binary code train, where $n$ is a positive integer, and inverting the polarity of all of the ON pulses in alternate groups of time slots. The polarity of each ON pulse is, in other words, controlled according to its time of occurrence. The continuous component of the power density spectrum of the pulse train remains unchanged, but the first discrete component above direct current is reduced in frequency by the factor $2n$. This component can be recovered for timing pulses at repeater points as before but, since it is considerably lower than the bit rate in frequency, is far less subject to crosstalk. It may, furthermore, be made to fall at different frequencies on adjacent lines in order to reduce timing crosstalk to a still lower level. The original binary code train is recovered from the pseudo-ternary pulse train by simple full-wave rectification.

In practice, embodiments of the invention contain two conversion channels and the contents of successive groups of $n$ time slots of the unipolar binary code train are routed into alternate channels in sequence to form two sub-trains. These sub-trains are, in accordance with the invention, combined in phase opposition to each other, yielding the desired three-level or pseudo-ternary pulse train.

A more complete understanding of the invention will be obtained from a study of the following detailed description of several specific embodiments. In the drawings.

Figure 1:
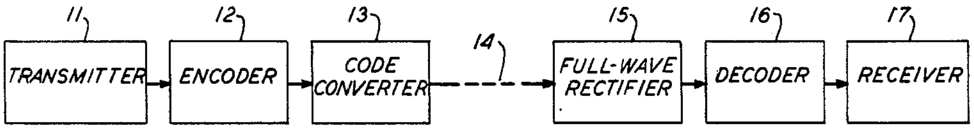
FIG. 1 is a block diagram showing the general outline of a PCM system employing the invention.

A PCM system in which the present invention finds ready application is shown in block diagram form in FIG. 1. There, a transmitter 11 supplies signal amplitude samples containing the intelligence to be transmitted to a PCM encoder 12. Encoder 12 converts the signal amplitude samples to unipolar code groups of ON and OFF pulses in conventional two-level binary code form and supplies them to a code converter 13. Code converter 13, which may take the form of the circuits illustrated in FIGS. 2 and 5, alters the discrete power density spectrum of the pulse train by producing a pseudo-ternary or three-level code train for transmission over transmission medium 14. This three-level pulse train is received by a suitable code restorer 15, which, in accordance with an important feature of the invention, is simply a full-wave rectifier. Rectifier 15 restores the pulse train to its original binary code form and supplies it to a PCM decoder 16. Decoder 16 converts each code group to an equivalent signal amplitude sample which is, in turn, transmitted to a receiver 17 for utilization.

Figure 2:
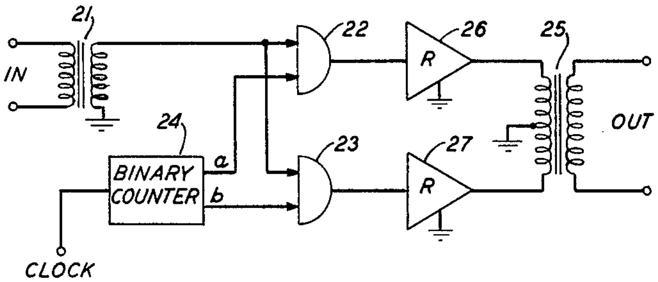
FIG. 2 illustrates a code converter embodying the present invention in which $n$ is equal to unity.

The code converter illustrated in FIG. 2 makes use of the principles of the invention by routing the contents of consecutive time slots of the binary code train into two separate conversion channels in alternation. Conventional unipolar binary code groups of marks or ON pulses and spaces or OFF pulses are received from the system encoder on an input transformer 21. Routing is accomplished by a pair of AND gates 22 and 23 in combination with a binary or scale-of-two counter 24. Each AND gate has a pair of input leads and energizes its single output lead only when both input leads are energized simultaneously. Each AND gate is represented in the drawings by a semicircle in which the input leads extend only to the chord. One input lead of each AND gate receives pulses from input transformer 21. Binary counter 24, on the other hand, is driven by a suitable timing or clock source supplying pulses at the basic pulse repetition frequency or bit rate of the system. Counter 24 has two output leads, labeled *a* and *b*, respectively, that are opposite to one another in state at all times and supply the remaining input leads of AND gates 22 and 23.

AND gates 22 and 23, in the embodiment of the invention illustrated in FIG. 2, each control a separate conversion channel for the appropriately routed pulses. Beginning with the first time slot of the first binary code group received on transformer 21, the action of binary counter 24, in response to the regular train of clock pulses, routes the contents of each odd-numbered time slot into the conversion channel controlled by AND gate 22 and the contents of each even-numbered time slot into the conversion channel controlled by AND gate 23. As a result, each conversion channel carries a sub-train of unipolar pulses which is combined in phase opposition with the other sub-train by an output transformer 25. A regenerative pulse amplifier 26 is connected between the output lead of AND gate 22 and one end of the primary winding of transformer 25 to provide sharply defined pulses of standard amplitude. A second regenerative pulse amplifier 27 is similarly connected between the output lead of AND gate 23 and the other end of the winding. The midpoint of the primary winding of output transformer 25 is grounded to provide the necessary circuit balance.

Figure 3:
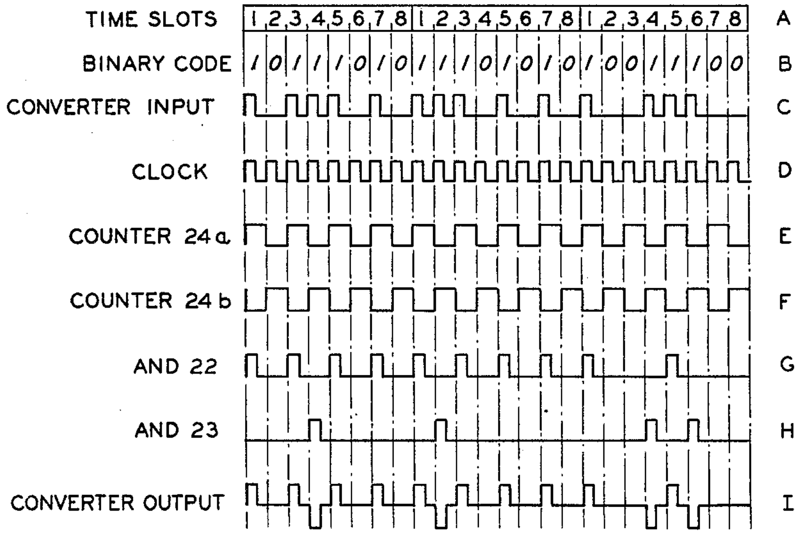
FIG. 3 shows a series of waveforms appearing at various points in the converter of FIG. 2 for different input signals.

The operation of the embodiment of the invention shown in FIG. 2 is illustrated by the waveform shown in FIG. 3. A fifty percent duty cycle is shown by way of example. In FIG. 3, line A indicates the successive time slots for three consecutive code groups, and line B gives the conventional binary number representation of three eight-digit code groups used as examples. The waveform of the succession of corresponding unipolar code groups received by input transformer 21 is shown in line C. The so-called clock wave is shown in line D, and the action of binary counter 24 is shown in lines E and F. As illustrated in lines G and H, the two conversion channels headed by AND gates 22 and 23 carry the contents of the respective odd and even time slots. The sub-trains contained in these two conversion channels are, in accordance with the invention, combined in phase opposition to each other, with all ON and OFF pulses retaining their original sequence, resulting in the final three-level pseudo-ternary code pulse train illustrated in line I. As shown, each ON pulse occupying an even-numbered time slot is inverted in polarity.

Figure 4A:
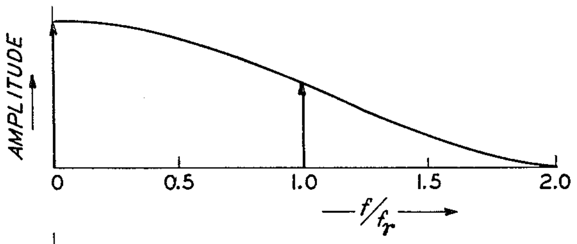
FIGS. 4A, 4B and 4C illustrate the power density spectra provided by embodiments of the present invention in comparison with one afforded by conventional unipolar pulse transmission techniques.
Figure 4B:
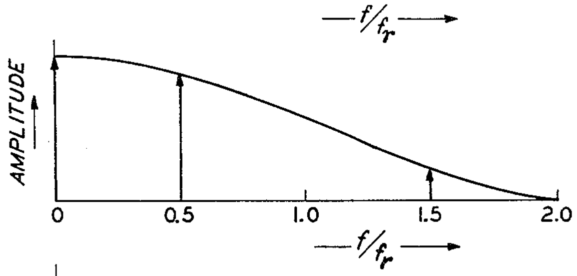

The power density spectrum for the three-level pulse train provided by the embodiment of the invention illustrated in FIG. 2 is shown in FIG. 4B for a fifty percent duty cycle. FIG. 4A illustrates the power density spectrum for the conventional unipolar binary code train used for transmission in the past. As shown, both have continuous and direct components. The continuous component is the same in both figures, having its maximum at zero frequency and diminishing gradually in the conventional $$\left(\frac{\sin x}{x}\right)^2$$

fashion until it reaches zero amplitude at a frequency equal to twice the bit rate $f_R$. At higher frequencies, the amplitude of the continuous component is so low as to be relatively insignificant. It is, therefore, not shown. The difference between the power density spectra shown in FIGS. 4A and 4B lies in their discrete components. As shown in FIG. 4A, the conventional unipolar binary code train has discrete components at zero frequency and again at the basic pulse repetition frequency of the system. Additional discrete components exist at odd multiples of the bit rate but they, too, are relatively insignificant in amplitude and are omitted from the figure. The discrete components, it should be noted, follow the continuous component in their relative amplitudes.

It is the discrete component at the bit rate that is normally recovered, along with any portion of the continuous component at that frequency, at repeater points and used for timing purposes when the power density spectrum is that shown in FIG. 4A. When the bit rate is so high that crosstalk between adjacent lines at that frequency becomes significant, the present invention is particularly advantageous. As illustrated in FIG. 4B, the power density spectrum afforded by the embodiment of the invention shown in FIG. 2 has discrete components at zero frequency and again at half the bit rate and odd multiples of $f_R/2$. As in the spectrum of FIG. 4A, the discrete components follow the continuous component in amplitude. The discrete component at half the bit rate may be readily recovered at repeater points and used to time the regeneration of the pulse train in much the same manner as such a component at the bit rate itself. The bit rate itself can be derived by conventional frequency doubling techniques. Since the transmitted timing component is reduced in frequency by a factor of two, however, timing crosstalk between adjacent lines is drastically reduced.

In general, the invention contemplates routing the contents of successive groups of *n* consecutive time slots into alternate conversion channels in sequence, where *n* is a positive integer. The greater the value of *n*, the lower in frequency is the first discrete component of the power density spectrum of above direct current. The scale of the counter used is, in each instance, equal to the quantity $(n+1)$. The value of *n* is, in general, subject to practical limitations since the amount of reduction in the frequency of that first discrete component diminishes with each higher value of *n*. Thus, *n* equal to unity yields a discrete component at half the bit rate, *n* equal to 2 yields one at one-quarter of the bit rate, and *n* equal to 3 yields one at one-eighth of the bit rate. Eventually there comes a point where the benefits realized are outweighed by the complexity and cost of the higher order counter circuits.

Figure 5:
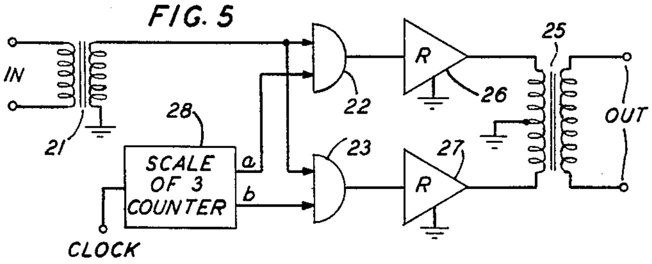
FIG. 5 shows a code converter embodying the present invention in which $n$ is equal to 2.

The embodiment of the invention illustrated in FIG. 5 is generally similar to the one illustrated in FIG. 2, but uses a scale-of-three counter 28 in place of binary counter 24. The value of *n* is thus 2. Scale-of-three counter 28 generates one output pulse for every three input pulses. It requires a sequence of two ON pulses, in other words, to change state. Like binary counter 24 in FIG. 2, scale-of-three counter 28 has two output terminals, labeled *a* and *b*, respectively, that are opposite to one another in state at all times and are connected to AND gates 22 and 23.

Figure 6:
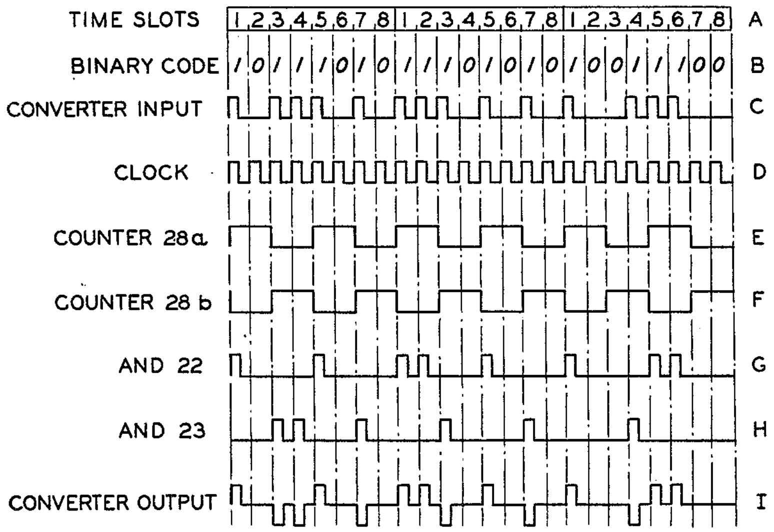
FIG. 6 shows a series of waveforms appearing at various points in the converter of FIG. 5 for different input signals.

The operation of the code converter shown in FIG. 5 is illustrated by the waveforms of FIG. 6. As in FIG. 3, line A indicates the successive time slots for three consecutive code groups, and line B gives the conventional binary number representation of three eight-digit code groups used as examples. The waveform of the corresponding unipolar two-level code groups themselves is illustrated in line C. The so-called clock wave is shown in line D. Lines E and F show the action of scale-of-three counter 28, while lines G and H show the sub-trains carried by the conversion channels controlled by AND gates 22 and 23. The final three-level bipolar train is shown in line I. As illustrated, each ON pulse appearing in every other group of two consecutive time slots is inverted in polarity.

Figure 4C:
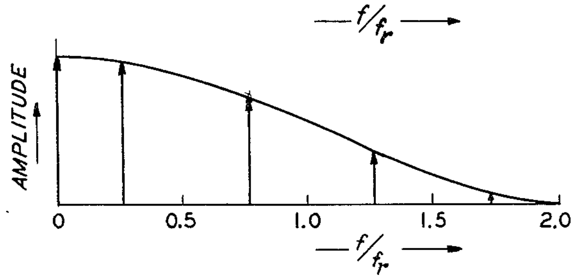

The power density spectrum for the three-level train provided by the embodiment of the invention shown in FIG. 5 is illustrated in FIG. 4C. As shown, it has the same continuous component illustrated in FIGS. 4A and 4B. The discrete components above zero frequency differ, however, in that they exist at one-quarter of the bit rate and at odd multiples of $f_R/4$. Since the first discrete component above direct current is still lower in frequency in FIG. 4C than the one in FIG. 4B, it is still less subject to crosstalk interference from adjacent lines.

From one point of view, an important advantage of the present invention is that it makes possible a reduction in crosstalk interference even beyond that afforded by the lower timing frequencies. One line may, for example, carry a pulse train with the power density spectrum of FIG. 4B, while another may carry one having that of FIG. 4C. The discrete components used for timing at repeater points are different and mutual interference is held to a minimum.

It is to be understood that the above-described arrangements are illustrative of the application of the principles of the invention. Numerous other arrangements may be devised by those skilled in the art without departing from the spirit and scope of the invention.

What is claimed is:

1. Apparatus for converting a two-valued binary code train of ON and OFF pulses having a basic pulse repetition frequency and a discrete power density spectrum in which the first component above zero frequency is located at said basic pulse repetition frequency, where said ON and OFF pulses are respectively different energy levels and all of said ON pulses have the same polarity with respect to said OFF pulses, into a three-valued pulse train having a discrete power density spectrum in which the first component above zero frequency is located at a sub-multiple of said basic pulse repetition frequency which comprises means for selecting successive groups of $n$ consecutive pulses from said two-valued binary code train, where $n$ is a positive integer, and means for inverting with respect to the OFF pulses the polarity of the ON pulses of alternate ones of said selected groups while leaving the OFF pulses substantially undisturbed.

2. Apparatus in accordance with claim 1 in which $n$ is equal to unity and the first component above zero frequency of the discrete power density spectrum of said three-valued pulse train is located at half said basic pulse repetition frequency.

3. Apparatus for converting a two-valued binary code train of ON and OFF pulses having a basic pulse repetition frequency and a discrete power density spectrum in which the first component above zero frequency is located at said basic pulse repetition frequency, where said ON and OFF pulses are respectively different energy levels and all of said ON pulses have the same polarity with respect to said OFF pulses, into a three-valued pulse train having a discrete power density spectrum in which the first component above zero frequency is located at a sub-multiple of said basic pulse repetition frequency which comprises a pair of conversion channels, means for routing successive groups of $n$ consecutive pulses from said two-valued binary code train into alternate ones of said conversion channels in sequence, where $n$ is a positive integer, means for inverting with respect to the OFF pulses the polarity of all of the ON pulses in one of said conversion channels while leaving the OFF pulses substantially undisturbed, and means for combining pulses from both of said conversion channels in their original sequence.

4. Apparatus in accordance with claim 3 in which $n$ is equal to unity and the first component above zero frequency of the discrete power density spectrum of said three-valued pulse train is located at half said basic pulse repetition frequency.

5. Apparatus for converting a two-valued binary code train of ON and OFF pulses having a basic pulse repetition frequency and a discrete power density spectrum in which the first component above zero frequency is located at said basic pulse repetition frequency, where said ON and OFF pulses are respectively different energy levels and all of said ON pulses have the same polarity with respect to said OFF pulses, into a three-valued pulse train having a discrete power density spectrum in which the first component above zero frequency is located at a sub-multiple of said basic pulse repetition frequency which comprises a pair of conversion channels, means for routing successive groups of $n$ consecutive pulses from said two-valued binary code train into alternate ones of said conversion channels in sequence to form a pair of sub-trains, where $n$ is a positive integer, and means for combining said sub-trains in phase opposition to each other, whereby all of the ON pulses in one of said sub-trains are inverted in polarity with respect to the OFF pulses and all of the OFF pulses in both of said sub-trains and all of the ON pulses in the other of said sub-trains are left substantially undisturbed.

6. Apparatus in accordance with claim 5 in which $n$ is equal to unity and the first component above zero frequency of the discrete power density spectrum of said three-valued pulse train is located at half said basic pulse repetition frequency.

7. Apparatus for converting a two-valued binary code train of ON and OFF pulses occupying a regularly spaced succession of time slots occurring at a basic pulse repetition frequency and having a discrete power density spectrum in which the first component above zero frequency is located at said basic pulse repetition frequency, where said ON and OFF pulses are respectively different energy levels and all of said ON pulses have the same polarity with respect to said OFF pulses, into a three-valued pulse train having a discrete power density spectrum in which the first component above zero frequency is located at a sub-multiple of said basic pulse repetition frequency which comprises a pair of conversion channels, means for routing the contents of successive groups of $n$ consecutive time slots of said two-valued binary code train into alternate ones of said conversion channels in sequence, where $n$ is a positive integer, means for inverting with respect to the OFF pulses the polarity of all of the ON pulses in one of said conversion channels while leaving the OFF pulses substantially undisturbed, and means for combining pulses from both of said conversion channels in their original sequence.

8. Apparatus in accordance with claim 7 in which $n$ is equal to unity and the first component above zero frequency of the discrete power density spectrum of said three-valued pulse train is located at half said basic pulse repetition frequency.

9. Apparatus for converting a two-valued binary code train of ON and OFF pulses occupying a regularly spaced succession of time slots occurring at a basic pulse repetition frequency and having a discrete power density spectrum in which the first component above zero frequency is located at said basic pulse repetition frequency, where said ON and OFF pulses are respectively different energy levels and all of said ON pulses have the same polarity with respect to said OFF pulses, into a three-valued pulse train having a discrete power density spectrum in which the first component above zero frequency is located at a sub-multiple of said basic pulse repetition frequency which comprises a pair of conversion channels, means for routing the contents of successive groups of $n$ consecutive time slots of said two-valued binary code train into alternate ones of said conversion channels in sequence to form a pair of sub-trains, where $n$ is a positive integer, and means for combining said sub-trains in phase opposition to each other, whereby all of the ON pulses in one of said sub-trains are inverted in polarity with respect to the OFF pulses and all of the OFF pulses in both of said sub-trains and all of the ON pulses in the other of said sub-trains are left substantially undisturbed.

10. Apparatus in accordance with claim 9 in which $n$ is equal to unity and the first component above zero frequency of the discrete power density spectrum of said three-valued pulse train is located at half said basic pulse repetition frequency.

11. Apparatus for converting a two-valued binary code train of ON and OFF pulses having a basic pulse repetition frequency and a discrete power density spectrum in which the first component above zero frequency is located at said basic pulse repetition frequency, where said ON and OFF pulses are respectively different voltage levels and all of said ON pulses have the same polarity with respect to said OFF pulses, into a three-valued pulse train having a discrete power density spectrum in which the first component above zero frequency is located at a submultiple of said basic pulse repetition frequency which comprises a scale of $m$ counter having a pair of outputs, where $m$ is an integer greater than unity, said counter generating an OFF pulse at each of its outputs whenever it generates an ON pulse at the other of its outputs, a clock source generating ON pulses at said basic pulse repetition frequency, a pair of AND gates each having a single output, means to apply the ON pulses generated by said clock source to said counter, means to apply both said two-valued binary code train and one of the outputs of said counter to one of said AND gates, means to apply both said two-valued binary code train and the other of the outputs of said counter to the other of said AND gates, an output transformer having a center-tapped primary winding, the center tap of said primary winding being connected to the voltage level of said OFF pulses, and means connecting the outputs of said AND gates to respectively opposite ends of said primary winding.

12. Apparatus in accordance with claim 11 in which said counter is a binary counter and the first component above zero frequency of the discrete power density spectrum of said three-valued pulse train is located at half said basic pulse repetition frequency.

References Cited in the file of this patent

UNITED STATES PATENTS 2,700,696 Barker ________________ Jan. 25, 1955